United States Patent

Beauvent

[11] Patent Number: 5,843,223
[45] Date of Patent: Dec. 1, 1998

[54] METHOD FOR PRODUCING MINERAL PRODUCTS HAVING A GREAT HEAT CONTENT FROM WASTE MATERIALS AND SLURRIES AND RESULTING PRODUCTS

[75] Inventor: Guy Beauvent, Wierre Effroy, France

[73] Assignee: Carrieres du Boulonnais, Ferques, France

[21] Appl. No.: 751,616

[22] Filed: Nov. 18, 1996

[30] Foreign Application Priority Data

Nov. 21, 1995 [FR] France ................................. 95 13777

[51] Int. Cl.⁶ ....................................... C04B 7/24
[52] U.S. Cl. .......................... 106/697; 106/745; 588/257
[58] Field of Search .................................. 106/745, 697; 588/257

[56] References Cited

U.S. PATENT DOCUMENTS 3,770,469  11/1973  Kapolyi et al. ........................ 106/763

FOREIGN PATENT DOCUMENTS 0 347 808  12/1989  European Pat. Off. .
0 451 006  10/1991  European Pat. Off. .
0 139 938   1/1980  Germany .

OTHER PUBLICATIONS

Chemical Abstracts, vol. 118, No. 22, 31 May 1993. Kurdowski, Wieslaw et al., "Manufacture of cement clinkers from waste slurry from extraction in alumina manufacture."

Chemical Abstracts, vol. 113, No. 16, 15 Oct. 1990. Agzamov F. et al., "Method of obtaining belite binder."

Chemical Abstracts, vol. 103, No. 26, 30 Dec. 1985. Majling J. et al., "Belite clinkers", p. 296.

Chemical Abstracts, vol. 92, No. 10, 10 Mar. 1980. Allik, A., "Raw material resources for the production of cement in Guinea", p. 307.

Chemical Abstracts, vol. 106, No. 16, 20 Apr. 1987. Shirasaka, M., "Manufacture of gamma–dicalcium silicate powder", p. 340.

*Primary Examiner*—Paul Marcantoni
*Attorney, Agent, or Firm*—Browdy and Neimark

[57] ABSTRACT

The method for producing mineral products having a great heat content from waste materials and slurries and resulting products comprises the steps of: submitting the waste materials and slurries to a homogenizing mixing; making a stoichiometric mixture at least of $CaCO_3$, clay and $SiO_2$; circulating the stoichiometric mixture in at least one heating and calcinating furnace whereby a lime product is produced at a temperature for decarbonating $CaCO_3$; separating at least in part the lime product; and raising the temperature at least until obtainment of $(CaO)_2 (SiO_2)\beta$ having hydraulic properties and a crystallised form wherein $\beta$ is belite.

20 Claims, 1 Drawing Sheet

METHOD FOR PRODUCING MINERAL PRODUCTS HAVING A GREAT HEAT CONTENT FROM WASTE MATERIALS AND SLURRIES AND RESULTING PRODUCTS

FIELD AND PURPOSE OF THE INVENTION

The present invention relates to treating waste materials and slurries and more particularly waste slurries coming from quarries and forming residues from the washing of crushed stones of calcareous or calcareo-argillaceous quarries, or coming for example from the treatment of waste waters in order to make these slurries re-usable.

The waste slurries are, in the working of a quarry or in the treatment of waste waters, provided with un-usable waste materials which must be stored in great sized ponds in which these waste slurries are subjected to a slow natural evaporation. The slurries may be mixed or added with various components, for example residues of smokes from a treatment of industrial waste materials and/or an incineration of house waste material and/or industrial slurries containing various minerals, heavy metal oxides, gypsum, etc.

The invention, when carrying it into effect, enables a recovery and a treatment of these waste slurries, that come essentially from industrial or house inflammable waste materials of any kind, in particular cellulosic waste materials from plants or minerals, such as oils, hydrocarbons, plastics materials, etc., which reduces the treating costs.

The invention enables further to provide a purification of the treating gases and vapors coming from the use of the inventive method itself, while making possible to obtain products that can form loads, pozzolanas, clinkers, cements and even vitrified products able to encapsulate polluting matters, such as heavy metals and metal oxides contained in the slurries so treated and/or in the combustible products that are used during the treatment.

There is thus obtained, for a small cost, products having an important heat content that are similar from some cements but much lower in cost than those products, as well as vitrified products that encapsulate polluting matters and which can be used as loads or binders for the construction of various works without risking an ulterior polluting of the grounds or natural water sheets in which the products that are obtained by the method of the invention are used. Moreover, the products that are obtained, are of an extremely small size of particle and can have a natural size of about 5000 blaines.

The invention enables also to reduce the amount of heat that is transmitted to the atmosphere, comparatively to a mere combustion of waste materials that would be used as a heat source.

SUMMARY OF THE INVENTION

According to one feature of the invention, the method for producing mineral products having a great heat content from waste materials and slurries and resulting products, is characterized in the steps of: submitting the waste materials and slurries to a homogenizing mixing; making a stoichiometric mixture at least of $CaCO_3$, clay and $SiO_2$; circulating the stoichiometric mixture in at least one heating and calcinating furnace whereby a lime product is produced at a temperature for decarbonatating $CaCO_3$; separating at least in part the lime product; and raising the temperature at least until obtainment of $(CaO)_2 (SiO_2)\beta$ having hydraulic properties and a crystallized forme wherein $\beta$ is belite.

According to other features of the invention, in which all the percentages are given by weight.

the waste materials and slurries are treated in an oven that is heated at least in part by industrial, house and the like waste materials;

the waste materials and slurries come indifferently from the washing of quarry crushed products, water treating residues, and the like;

the waste materials and slurries are added with melting residues, industrial waste materials, house waste materials and other waste slurries that contain minerals and/or metal oxides;

the gases that are contained within the oven are treated, in particular reduced at least in part with the lime product that is obtained during the treatment;

the products that circulate in the oven are at least in part recycled;

a part at least of the products that circulate in the oven is submitted to a quenching operation;

the waste materials and slurries to be treated are granulated before being treated;

a part at least of the products is raised at least to a temperature for encapsulating polluting matters contained in the treated waste materials and slurries;

the temperature is raised up to vitrification temperature an addition of 5 to 10% of natural or synthetic gypsum is provided for forming a quick hardening cement;

an addition of calcium fluoride acting as a flux melting product is provided for lowering the temperature for encapsulating polluting matters contained in the treated waste materials and slurries;

20 to 80% of the product that is obtained is mixed with Portland cement;

the oven is of a type with successive cyclones, and the products are brought to counterflow circulate in the cyclones communicating with at least one burner formed by an oven;

the temperature is raised in a secondary oven which is pre-heated by a primary oven that contains the secundary oven at least in part.

Various other features of the invention will moreover be revealed from the detailed following disclosure.

BRIEF DESCRIPTION OF THE DRAWINGS

An embodiment of the invention is shown as a non limitative example in the accompanying drawings, wherein.

DETAILED DESCRIPTION OF THE INVENTION

Figure 1:
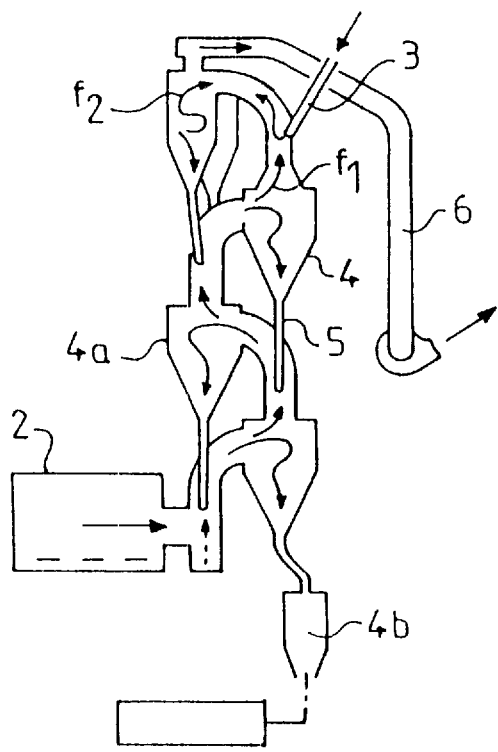
FIG. 1 is a diagrammatic view of a treating unit for obtaining products with a high heat content.

In the following description, the basic products to be treated are formed of waste slurries from a washing of stones of calcareous or calcareo-argillaceous quarries.

It has been generally found that, on a given site, the waste slurries coming from a washing of crushed calcareous or calcareo-argillaceous stones contained, after decantation in a pond, a substantially constant stoichiometric ratio of:

$X_1\%$ $CaO_3$ $X_2\%$ clay $X_3\%$ $SiO_2$ $X_4\%$ $H_2O$

As an example, in a particular extraction site of calcareous stone situated in northern France near the town of Dunkirk, it has been found that the waste slurries to be treated according to the invention contained:

| | |
|---|---|
| 32.5% | $CaCO_3$ |
| 30% | clay |
| 22% | $SiO_2$ |
| 10% | $Al_2O_3$ |

Complementary to the above basic mineral components, the waste slurries contained metal oxides. A chemical analysis then showed the presence in the waste slurries of:

0.75% MgO
2.51% $Fe_2O_3$
0.42% $TiO_2$
1.15% $K_2O$
0.03% MnO
0.09% $P_2O_5$
0.06% $SO_3$
0.09% $Na_2O$
0.02% SrO
0.01% $Cr_2O_3$

Detailed chemical analyses have moreover shown the existence of traces of various metals and alkaloids, the concentration or dispersion of which must be prevented, at least for some of them, when recuperating the waste slurries that contain these traces of various metals and alkaloids and their ulterior positioning in locations having to be protected, for example in vicinity of natural water sheets.

Among these traces of metals and alkanoids, it has been found:

| ELEMENTS | PARTS PER MILLION (ppm) | ELEMENTS | PARTS PER MILLION (ppm) |
|---|---|---|---|
| Tl | 0.04 | Dy | 4.16 |
| Ta | 0.90 | Sm | 5.24 |
| Bi | 0.47 | Cd | 0.72 |
| Lu | 0.33 | Pb | 9.74 |
| Tm | 0.35 | Co | 12.01 |
| Tb | 0.72 | As | 17.25 |
| W | 1.61 | La | 29.85 |
| Eu | 1..07 | Nd | 26.38 |
| Sb | 1.27 | Pb | 50.25 |
| Hf | 4.34 | Zr | 127.00 |
| Ho | 0.91 | U | 4.55 |
| Nb | 9.96 | Ce | 56.17 |
| Th | 6.21 | Cu | 21.30 |
| Mo | 2.38 | Y | 28.40 |
| Yb | 2.23 | V | 91.45 |
| Er | 2.25 | Zn | 74.20 |
| Os | 9.18 | Ba | 127.00 |
| Be | 1.07 | Cr | 119.50 |
| Pr | 6.67 | Sc | 18.65 |
| Ga | 11.15 | | |
| Gd | 4.45 | | |

After mixing, decantation and dehydration by natural vaporation, the above mentioned stoichiometric mixture was under the form of calcareous fines of about 0 to 100 $\mu$.

The probability calculation showed, samely as testing experimentations, that the origin of the fines in the extraction pond did not substantially modify the stoichiometry of the components.

These calcareous fines were treated in a granulator for making granulates of about 0 to 2 mm.

The fines, preferably after having being granulated, were thermically treated in a decarbonation enclosure having for effect, in the vicinity of 900° C., to reduce the $CaCO_3$ into CaO and $CO_2$ and, consequently, to produce a lime product.

When such a production of lime product is not desired because of the impurities that are contained in the original slurries or because of any other reasons, the temperature is raised, for example up to 1200° C., so as to obtain a crystallized form with hydraulic properties of $(CaO)_2 (SiO_2) \beta$, hereinafter called $C_2S\beta$ that has a pyramidal structure and in which $\beta$ is constituted by belite.

The obtained $C_2S\beta$ has hydraulic properties but with a slow activity, at least in initiation of said hydraulic properties for the resulting hardening function.

It has however been found that the $S_2S\beta$, which is a hydraulic product with binding features, may advantageously be mixed with Portland cement, for example in a respective proportion of 20%/80% for forming a high stability binder, this binder being possibly hardened with sea water.

Figure 2:
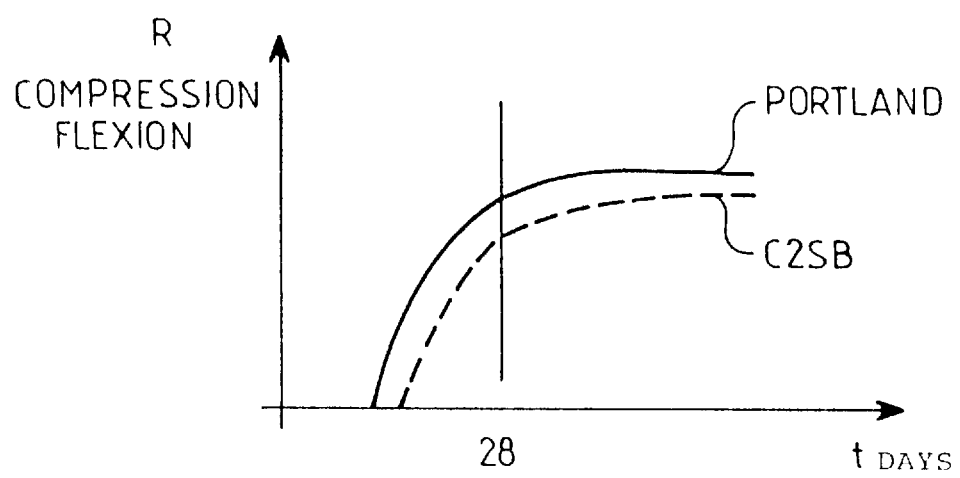
FIG. 2 is a comparative graph illustrating hardening durations of comparable products.

FIG. 2 shows, as an example, a graph making apparent the respective hardening speeds, in a solid line, of Portland cement and, in dotted lines, of $C_2S\beta$ in the above mentioned ratio.

There is found that, without other additives, an hardening starts within a time of about 8 days for reaching a first characteristic threshold after 28 days, the $C_2S\beta$ mixed with the Portland cement in the 20–80 ratio meeting substantially the characteristic of the later after a plurality of months and remaining then of a great stability. It is then possible to use the product for works that necessitate successive casting but that must have a great structural homogeneity as for example in the case of dams, embarkments, etc. By increasing the proportion of $C_2S\beta$, the release of heat upon hydrating is reduced, which concomitantly reduces the shrinkage and permits a construction of works having a great stability.

Another operation, which is carried into effect when it is desired to obtain only $C_2S\beta$ is, for increasing the concentration, to submitt $C_2S\beta$, at a high temperature, to a sudden quenching or tempering, for example an air quenching in a cyclone. The $C_2S\beta$ thus obtained can then advantageously be used for an encapsulating of waste products having be vitrified.

By raising the temperature beyound 1200° C., as this is possible by using for example a plasma torch, there is obtained vitrified products that form encapsulating traps for heavy metals, for example cadmium, lead and its compounds, and the heavy metal oxides such as titane oxides, which are matters that may be present in the waste slurries which are used.

For forming pozzolana, decarbonating the waste slurries, and then forming $C_2S\beta$, the invention provides to use ovens that are fed from inflammable waste products of any kind and typically industrial waste products, house waste products, hospital waste products, etc. and, more generally, any waste products with a cellulose base as well as waste products that contain fatty product, hydrocarbons, cutting oils and the like, the waste combustion products of which are brought to be recycled from the production of $C_2S\beta$ in order to be concentrated. The part to be concentrated is then possibly raised to a higher temperature in order to be vitrified by encapsulating polluting matters coming both from the waste slurries and from the gases of the working ovens, and which must be taken away.

Although various types of ovens may be used for obtaining the $C_2S\beta$, it is advantageous, as illustrated in FIG. 1, to use a riser oven 1 with recycling comprising one or more burners 2, with these burners being formed for example by one or more ovens and permitting to develop a temperature of about 1200° C. in the riser in which fines are made to circulate, which fines are coming from granulates of waste slurries and from the granulates that are injected ahead through a duct 3 leading to a cyclone 4 emerging on a re-injecting duct 5 leading to a second cyclone 4a, etc.

The products that are so treated are re-injected in a counterflow as shown by arrows f1, f2 for ensuring a counterflow circulation.

A portion of the treated products is then supplied, through a circuit 6, to a hopper for the storing of $C_2S\beta$.

When the products must be vitrified at a higher temperature, upper than 1200° C., they are derived, for example from the cyclone 4b, to be passed into an other oven of a same type or different construction, for example a plasma oven or the like.

When industrial or house waste products are used for heating, the one or more burners 2 burn these waste materials, and these burners 2 may obviously be an integral part of the oven, if the oven is of an other type than the riser oven as shown in the drawings.

When it is necessary to proceed with a very high temperature treatment, for example a treatment at a temperature higher than 1200° C., it is advantageous according to the invention to provide, in the main oven and for example within the riser, a secundary oven cavity in which the product to be treated or the portion of product to be treated is brought, this secundary oven cavity being pre-heated by the main oven, and the complementary heat source, for example a plasma torch, being interested only by the inside of the cavity of said complementary oven.

The combined arrangement of two or more ovens may also be made when the main oven is a grate oven or a fluidized belt oven or an oven of another type for permitting a simultaneous utilisation of the heat coming from waste materials. This arrangement thus necessitates an input of expensive heat only for a relatively small temperature raise comprised between the temperature of the main oven and that of the secundary oven used for the high temperature calcination.

Subsidiarily, it is advantageous to treat the combustion gases at least in the main oven to reduce those gases by means of the lime product that is produced, particularly in order to provide an absorption of $SO_2$.

It is possible in other embodiments to use slurries from other origins, for example industrial waste slurries, slurries from the treatment of waste waters, etc. The slurries may be mixed together and preferably with the calcareous slurries as before mentioned. The calcinating treatment is made as herein described, and it is also possible to add other components, for example natural or artificial gypsum, in order to accelerate the hardening speed of the belitic cement which is obtained after calcinating. An addition of 5 to 10% of gypsum permits to obtain a cement with fast hardening properties corresponding to a Portland cement. Samely, an addition of $Fe_2O_3$ makes possible to obtain a cement the hardening of which can be made at temperature lower than 0° C.

When it is necessary to encapsulate residues, in particular residues of heavy metals, a further feature of the invention is to add a flux melting product such as calcium fluoride which makes possible to obtain a sulfurous belitic cement that makes an encapsulating from a temperature of 950° C.

The invention is not restricted to the embodiment herein shown and described in detail since various modifications thereof can be applied thereto without departing from the scope of the invention as shown in the accompanying claims:

What is claimed is:

1. A method for producing mineral products having a great heat content from waste materials and slurries and resulting products, comprising the steps of: submitting said waste materials and slurries to a homogenous mixing to obtain a homogenized product; making a stoichiometric mixture at least of $CaCO_3$, clay and $SiO_2$ from said homogenized product; circulating said stoichiometric mixture in at least one heating and calcinating oven whereby a lime product is produced at a temperature for decarbonating $CaCO_3$; separating at least in part said lime product; and raising said temperature to a level effective for obtaining $(CaO)_2 (SiO_2) \beta$ having hydraulic properties and a crystallized form wherein $\beta$ is belite.

2. A method as set forth in claim 1, wherein said temperature is raised at least to 1200° C.

3. A method as set forth in claim 1, wherein said waste materials and slurries are treated in an oven that is heated at least in part by industrial and house waste materials.

4. A method as set forth in claim 1, wherein said waste materials and slurries come at least in part from a washing of quarry crushed products and water treating residues.

5. A method as set forth in claim 1, wherein said waste materials and slurries are added with melting residues of industrial waste materials, house waste materials and other waste slurries that contain minerals and metal oxides.

6. A method as set forth in claim 1, wherein gases are contained in said oven, said gases being treated at least in part by said line products.

7. A method as set forth in claim 1, wherein gases are contained in said oven, said gases being reduced at least in part by said lime product.

8. A method as set forth in claim 1, wherein gaseous products that circulate in said oven are at least in part recycled.

9. A method as set forth in claim 1, wherein solid products that circulate in said oven are at least in part recycled.

10. A method as set forth in claim 8, wherein a part at least of said gaseous products is submitted to a quenching operation.

11. A method as set forth in claim 9, wherein a part at least of said solid products is submitted to a quenching operation.

12. A method as set forth in claim 1, wherein said waste materials and slurries to be treated are granulated before being treated.

13. A method as set forth in claim 1, wherein said treated waste materials and slurries contain polluting, matters, and wherein a part at least of products that circulate in the oven is raised to a temperature effective for encapsulating said waste materials and slurries.

14. A method as set forth in claim 13, wherein said temperature is raised to a level effective for vitrification of said waste materials and slurries.

15. A method as set forth in claim 1, comprising the step of adding 5 to 10% of naturally occuring gypsum for forming a quick hardening cement.

16. A method as set forth in claim 1, comprising the step of adding 5 to 10% of manufactured gypsum for forming a quick hardening cement.

17. A method as set forth in claim 1, wherein said method comprises the further step of adding calcium fluoride as a fluxing agent for the purpose of lowering the melting temperature of encapsulating said waste materials and slurries.

18. A method as set forth in claim 1, comprising the further step of mixing 20 to 80% of the product that is obtained with Portland cement.

19. A method as set forth in claim 1, wherein said oven contains serially connected cyclones and wherein said waste materials and slurries are brought to counterflow circulate in cyclones communicating with at least one burner formed by an oven.

20. Method as set forth in claim 1, wherein said oven contains at least in part a secondary oven, and wherein said temperature is raised in said secondary oven.

* * * * *